United States Patent [19]
Oh et al.

[11] Patent Number: 5,844,644
[45] Date of Patent: Dec. 1, 1998

[54] LIQUID CRYSTAL DISPLAY WITH MICROLENSES BETWEEN INTERDIGITAL ELECTRODES AND METHOD

[75] Inventors: Young-Jin Oh; Jeong-Hyun Kim; Dong-Hyo Gu, all of Kyunggi-do; Kyoung-Nam Lim, Seoul, all of Rep. of Korea

[73] Assignee: LG Electronics Inc., Seoul, Rep. of Korea

[21] Appl. No.: 898,579

[22] Filed: Jul. 22, 1997

[30] Foreign Application Priority Data

Oct. 9, 1996 [KR] Rep. of Korea .................. 96-44739

[51] Int. Cl.$^6$ .................................................. G02F 1/1335
[52] U.S. Cl. ............................................. 349/95; 349/141
[58] Field of Search ............................... 349/95, 44, 110, 349/111, 141

[56] References Cited

U.S. PATENT DOCUMENTS

| | | | |
|---|---|---|---|
| 5,473,453 | 12/1995 | Kurematsu | 349/95 |
| 5,682,215 | 10/1997 | Nishihara et al. | 349/95 |
| 5,689,315 | 11/1997 | Fushimi et al. | 349/95 |

*Primary Examiner*—William L. Sikes
*Assistant Examiner*—Kenneth Parker

[57] ABSTRACT

A liquid crystal display with in-plane switching mode for improving its light transmittance, includes a first substrate that forms light transmissive portions and light untransmissive portions, a second substrate, and liquid crystal injected between the first and second substrates. The second substrate includes a black matrix, a color filter layer, an overcoat layer and an alignment film. The overcoat layer is patterned to form micro-lenses for refracting the incident light to pass through the light transmissive portions without being blocked by the light untransmissive portions. Various patterning methods can be selected to form the micro-lenses.

27 Claims, 2 Drawing Sheets

LIQUID CRYSTAL DISPLAY WITH MICROLENSES BETWEEN INTERDIGITAL ELECTRODES AND METHOD

BACKGROUND OF THE INVENTION

1. Field of the Invention

The present invention relates generally to a liquid crystal display, and more particularly to a liquid crystal display with in-plane switching mode having micro-lenses on a substrate and a color filter layer so as to improve the light transmittance of the liquid crystal display.

2. Description of the Prior Art

Liquid crystal displays (LCDs) find various applications due to the unique advantages of having a light weight and small size. A conventional LCD includes two substrates. A first substrate includes pixel electrodes and a second substrate includes counter electrodes. The first and second substrates are set in opposite to each other, and liquid crystal is inserted therebetween. In the conventional LCDs, the alignment of the liquid crystal is vertical to the substrate plane according to the direction of electric field applied. This causes a problem of narrow viewing-angle in the conventional LCDs. An LCD with an in-plane switching (IPS) mode has been developed to overcome such a problem.

The LCD with IPS mode forms both the pixel electrode and the counter electrode on the first substrate. In that case, the electric field direction between them is in parallel to the substrate plane. As a result, the alignment of the liquid crystal is also in parallel to the substrate plane, thereby allowing a wide viewing-angle. A detailed description of the conventional LCD with IPS mode is as follows.

FIG. 1 is a three-dimensional perspective view showing the structure of a conventional LCD with IPS mode. On a first substrate 10, there are formed gate bus lines 11 in a transverse direction and source bus lines 15 in a longitudinal direction. An I-type pixel electrode 17 is connected to a drain electrode of a TFT 14 which makes an electrical contact with the source bus line 15 and the gate bus line 11. A counter electrode 12 formed on the first substrate 10 has a rectangular shape and surrounds the pixel electrode 17 as shown in FIG. 1. As a result, the electric field direction is parallel to the substrate plane.

The counter electrode 12 and the pixel electrode 17 are made of a metal such as aluminum or chromium, instead of indium tin oxide (ITO), since such metal in general has a lower electrical resistance than ITO, which facilitates the formation of electric field even though the size of the electrodes is smaller compared to that of the conventional LCDs. Then, an alignment film is formed on the surface to array the liquid crystal.

FIG. 2 is a cross-sectional view of the conventional LCD taken along line II—II in FIG. 1 and shows elements of the conventional LCD. The counter electrode 12 is formed on the first substrate 10 and is covered by an insulation film 13 using, for example, silicone nitride. Then the source bus line 15 and the pixel electrode 17 are formed and an alignment film 28 is formed.

A second substrate 20 includes a color filter layer 23 comprising color filters of red (R), green (G) and blue (B). A black matrix 21 is formed between the color filters. An overcoat layer 25 is formed on the color filter layer 23 to protect the liquid crystal from contamination from the black matrix 21. Then an alignment film 28 using, for example, polyamide is formed to array the liquid crystal.

According to the structure of the conventional LCD with IPS mode, the incident light from the light source set behind the second substrate is blocked when it reaches the untransmissive portion of the first substrate. The untransmissive portion includes the bus lines, the pixel electrodes 17 and the counter electrode 12 as shown in FIG. 2. The conventional LCD has reduced light transmittance since the light can pass only through the transmissive portion of the first substrate surrounded by the untransmissive portion. Various shapes of the transmissive portion may be obtained according to the combination of a pixel electrode and a counter electrode on the first substrate. Still, however, it is inevitable for the conventional LCD with IPS mode to have a low light transmittance due to the intrinsic structure of the conventional LCD having the light untransmissive portion.

Additionally, since in the conventional LCD with IPS mode the counter electrodes are formed on the first substrate along with the pixel electrodes, the aperture ratio of the LCD is low, at about 30–40%. As a result, the brightness of the screen is substantially reduced. This causes problems in that an additional power supply is needed to increase the brightness of the screen and compensate for the reduction in brightness. But the additional power supply increases the weight of the LCD.

SUMMARY OF THE INVENTION

An object of the present invention is to provide a liquid crystal display which overcomes the above and other problems of the conventional LCDs.

It is further an object of the present invention to provide modifications to the overcoat layer of the second substrate for forming micro-lenses which refract the incident light to pass through the light transmissive portions of the first substrate, without being blocked by the untransmissive portions of the first substrate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a liquid crystal display device including a first substrate having a light transmissive portion and a light untransmissive portion which has pixel electrodes and counter electrodes, a second substrate, and a liquid crystal between the first and second substrates, the device comprising a focusing layer formed on the second substrates in opposite to the light untransmissive portion of the first substrate for focusing a light passing through the focusing layer onto the light transmissive portion of the first substrate.

Furthermore, the present invention is directed to a method of operating a liquid crystal display device including a first substrate having a light transmissive portion and a light untransmissive portion which has pixel electrodes and counter electrodes, a second substrate, and a liquid crystal between the first and second substrates, the method comprising the steps of generating a light using a light source set behind the second substrate; and focusing the generated light passing through the second substrate onto the light transmissive portion of the first substrate.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
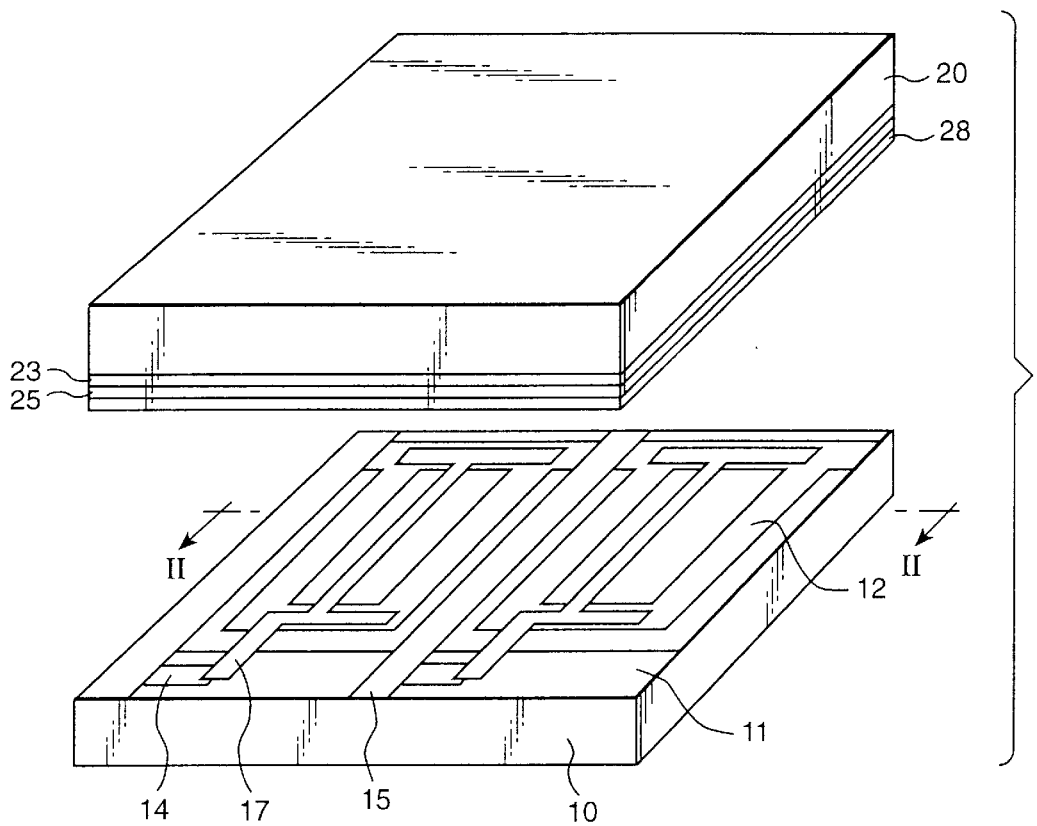
FIG. 1 is a three-dimensional perspective view showing a structure of a conventional LCD with in-plane switching mode.
Figure 2:
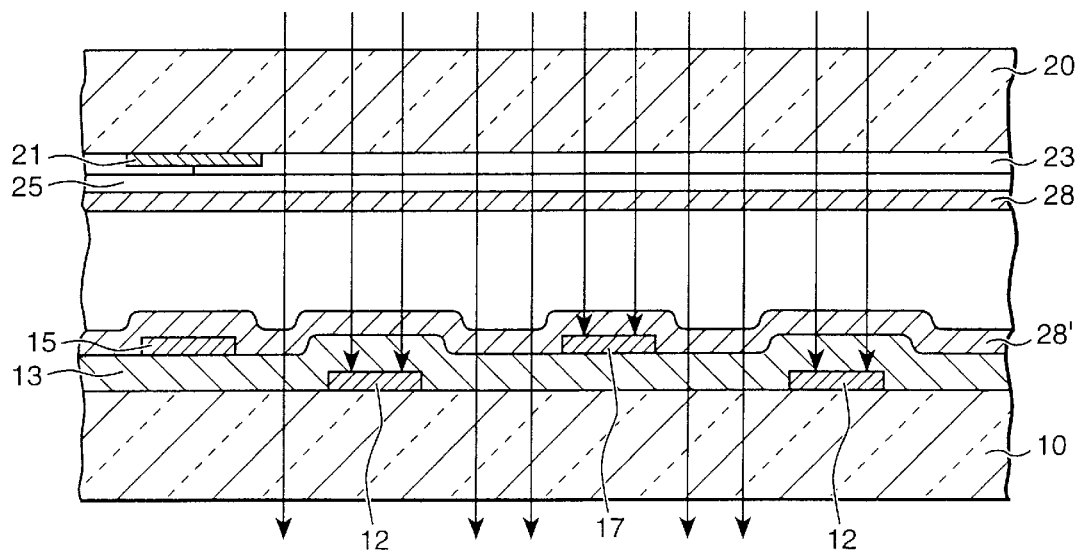
FIG. 2 is a cross-sectional view of a conventional LCD with in-plane switching mode taken along line II—II of FIG. 1.
Figure 3:
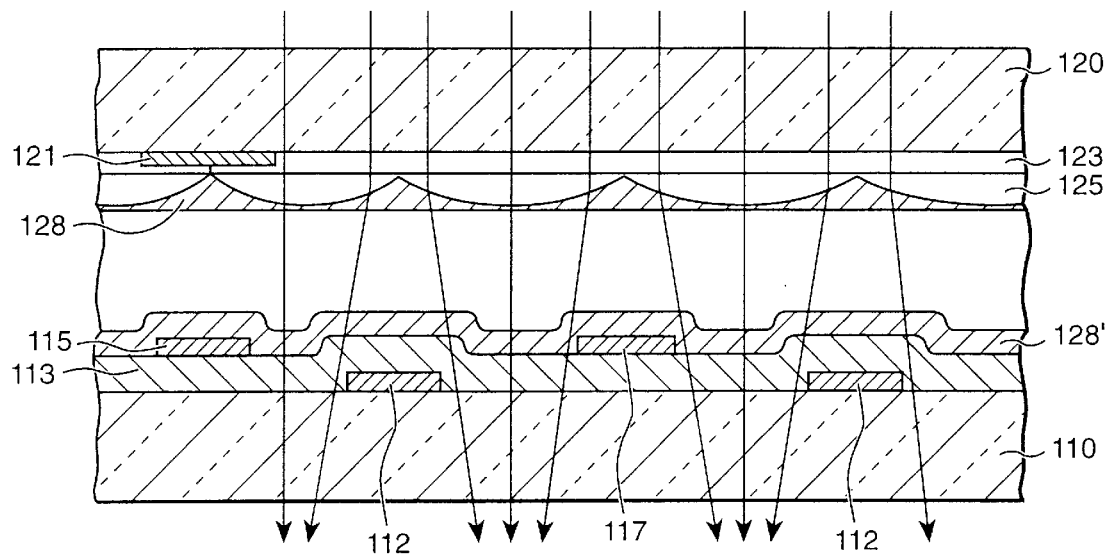
FIG. 3 is a cross-sectional view of an example of an LCD with in-plane switching mode according to the embodiments of the present invention.

Referring to the drawings, FIG. 3 shows a cross-sectional view of an LCD with an in-plane switching mode according to the embodiments of the invention.

As shown in FIG. 3, a black matrix 121 and a color filter layer 123 including a plurality of color filters are formed on a second transparent substrate 120. Subsequently, an overcoat layer 125 (focusing layer) is formed on the color filter layer 123. At this moment, the overcoat layer 125 is patterned and forms micro-lenses which are convex to a first transparent substrate 110. The micro-lenses formed by the overcoat layer 125 are connected to each other.

The center of each micro-lens is substantially aligned with the middle of the light transmissive portion of the first substrate 110. An alignment film 128 using, for example, polyamide is formed on the overcoat layer 125. In this case, the refractive index of the material for the overcoat layer 125 is selected to be higher than that of the alignment film 128. For example, the refractive index of the material for the overcoat layer may not less than 1.4. Thus, when a light source is set behind the second substrate 120 (the LCD may be structured so that the light source can be set behind the first substrate 110), the incident light approaching the untransmissive portions is refracted towards the middle of the light transmissive portion as the light from the micro-lenses passes the alignment film 128. As a result, the incident light is not blocked by the untransmissive portions of the first substrate 110. The untransmissive portions include pixel electrodes 117, source bus lines 115 and counter electrodes 112.

The counter electrodes 112 are formed on the first substrate 110 and are covered by an insulation film 113 using, for example, silicone nitride. Then the source bus lines 115 and the pixel electrodes 117 are formed, and an alignment film 128' is formed thereon.

When the light with an incident angle $\theta_1$ passes through an interface between two materials with different refractive indices, the refractive angle $\theta_2$ of the light depends on the values of refractive indices as known in Snell's law:

$$n_2/n_1 = \sin\theta_1/\sin\theta_2$$

wherein $n_1$ and $n_2$ are refractive indices of two materials. Thus, $\theta_2 < \theta_1$, when $n_2 > n_1$ and $\theta_2 > \theta_1$ when $n_2 < n_1$.

Therefore, the light transmittance of the LCD is improved by proper selecting $n_1$ and $n_2$, and by patterning the micro-lenses on the overcoat layer having either the convex or concave shape depending on the refractive indices. The incident light is refracted by the micro-lenses and passes through the light transmissive portions without being blocked by the light untransmissive portions.

Figure 4:
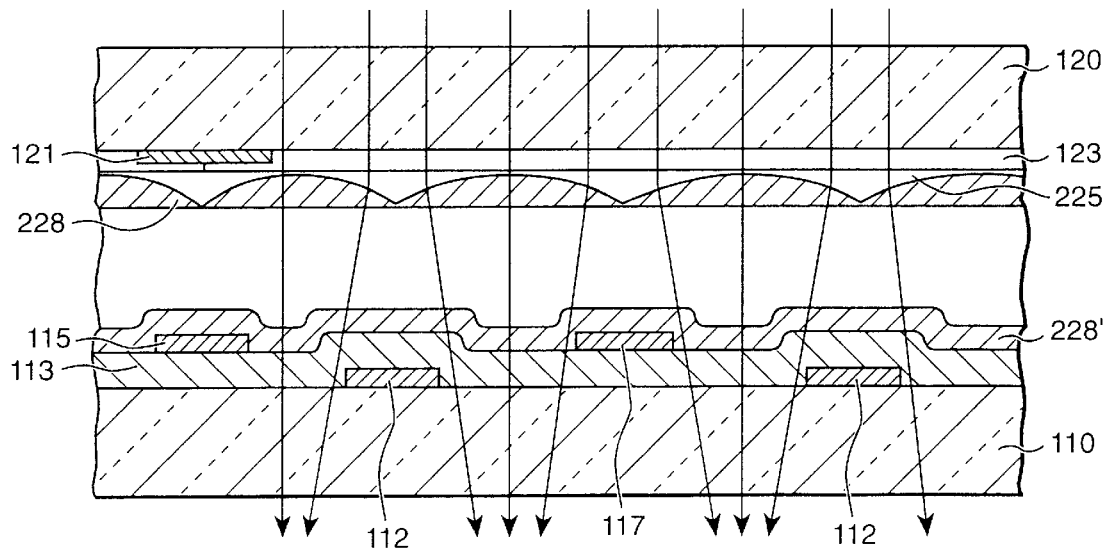
FIG. 4 is a cross-sectional view of another example of an LCD with in-plane switching mode according to the embodiments of the present invention.

FIG. 4 shows a cross-sectional view of another example of an LCD with an in-plane switching mode according to the embodiments of the invention. On the second transparent substrate 120, the color filter layer 123 including a plurality of color filter is formed. Subsequently, an overcoat layer 225 (focusing layer) is formed on the color filter layer 123. Here, the overcoat layer 225 is patterned and forms micro-lenses which are concave to the first substrate 110. The micro-lenses formed with the overcoat layer 225 are connected to each other. The center of each micro-lens substantially corresponds to the middle of the light transmissive portion of the first substrate 110.

Then an alignment film 228 using, for example, polyamide is formed on the overcoat layer 225. In this case, the refractive index of the overcoat layer 225 is selected to be lower than that of the alignment film 228. Thus, when the light source is set behind the second substrate 120 (light source may be set behind the first substrate 110), the incident light is refracted towards the middle of the light transmissive portions as the light enters the alignment film from the overcoat layer 225. As a result, the incident light is not blocked by the light untransmissive portions of the first substrate 110, which increases the light transmittance of the LCD.

As described above, the counter electrodes 112 in FIG. 4 are formed on the first substrate 110 and are covered by the insulation film 113 using, for example, silicone nitride. Then the source bus lines 115 and the pixel electrodes 117 are formed thereon and an alignment film 228' is formed thereon.

A focusing layer other than the overcoat layer 125, 225 may be patterned and an additional layer may be introduced to form the micro-lenses. Moreover, various patterning methods can be selected to achieve the above mentioned objects. For example, the part of the overcoat layer 125, 225 corresponding to both the light transmissive portion and the light untransmissive portion may be patterned to form micro-lenses, the part of the overcoat layer 125, 225 corresponding to the untransmissive portion may be patterned in the convex or concave shape, or only the part of the overcoat layer 125, 225 corresponding to the light untransmissive portion may be patterned to form the micro-lenses.

Accordingly, the present invention substantially increases the light transmittance of the LCD by providing a focusing layer or micro-lenses formed with the overcoat layers (e.g., layers 125 and 225) and overcomes the problems of the conventional LCD with IPS mode.

Although the invention has been described in conjunction with specific embodiments, it is evident that many alternatives and variations will be apparent to those skilled in the art in light of the foregoing description. Accordingly, the invention is intended to embrace all of the alternatives and variations that will fall within the spirit and scope of the appended claims.

What is claimed is:

1. A liquid crystal display device comprising:
   a first substrate including pixel electrodes, counter electodes, and regions between the pixel electrodes, and counter electrodes, the pixel and counter electrodes including light transmissive portions, the regions including light transmissive portions;
   a second substrate;
   a liquid crystal between the first and second substrates and
   a focusing layer formed on the second substrate for focusing a light passing through the focusing layer onto said light transmissive portions and away from said light untransmissive portions.

2. A device as claimed in claim 1, wherein the index of refraction of the focusing layer is not less than 1.4.

3. A device as claimed in claim 1, wherein the focusing layer includes micro-lenses which are convex towards the first substrate.

4. A device as claimed in claim 1, wherein the focusing layer includes micro-lenses which are concave towards the first substrate.

5. A device as claimed in claim 1, wherein the light directed to said light untransmissive portions of the first substrate is refracted and passes through said light transmissive portions of the first substrate.

6. A device as claimed in claim 1, wherein device has an in-plane switching mode.

7. A device as claimed in claim 1, wherein the focusing layer includes micro-lenses formed on the second substrate.

8. A device as claimed in claim 7, wherein the micro-lenses are connected to each other.

9. A device as claimed in claim 7, further comprising:

an alignment layer formed on the micro-lenses.

10. A device as claimed in claim 9, wherein the refractive index of the focusing layer is greater than that of the alignment layer.

11. A device as claimed in claim 10, wherein the micro-lenses are convex towards the first substrate.

12. A device as claimed in claim 9, wherein the refractive index of the focusing layer is less than that of the alignment layer.

13. A device as claimed in claim 12, wherein the micro-lenses are concave towards the first substrate.

14. A device as claimed in claim 9, further comprising:

a black matrix formed on the second substrate; and a color filter layer formed between the micro-lenses and the second substrate.

15. A device as claimed claim 9, further comprising:

an insulation film formed on the counter electrodes and under the pixel electrodes;

source bus lines formed on the insulation film; and another alignment film formed on the insulation film.

16. A method of operating a liquid crystal display device including a first substrate having pixel electrodes, counter electrodes, and regions between the pixel electrodes and counter electrodes; a second substrate; and a liquid crystal between the first and second substrates, wherein the pixel and counter electrodes include light untransmissive portions and the regions include light transmissive portions, the method comprising the steps of:

generating a light using a light source set behind the second substrate; and focusing the light passing tough the second substrate onto said light transmissive portions of the first substrate and away from said light untransmissive portions.

17. A method as claimed in claim 16, wherein said focusing step includes the step of:

passing the light through micro-lenses on the second substrate.

18. A method as claimed in claim 17, wherein in said passing steps, the refractive index of the micro-lenses is greater than that of the alignment layer.

19. A method as claimed in claim 17, wherein in said passing step, the micro-lenses are convex towards the first substrate.

20. A method as claimed in claim 17, wherein in said passing steps, the refractive index of the micro-lenses is less than that of the alignment layer.

21. A method as claimed in claim 17, wherein in said passing step, the micro-lenses are concave towards the first substrate.

22. A method as claimed in claim 16, wherein said focusing step includes the step of:

refracting the light approaching said light untransmissive portions of the first substrate so that the refracted light passes through said light transmissive portions of the first substrate.

23. A device as claimed in claim 7, wherein at least one of the pixel electrodes and counter electrodes corresponds to portions of two of the micro-lenses.

24. A device as claimed in claim 7, wherein at least one of the micro-lenses corresponds to at least one light transmissive portion, a portion of one pixel electrode, and a portion of one counter electrode.

25. A method as claimed in claim 17, wherein in said passing step, at least one of the pixel electrodes and counter electrodes corresponds to portions of two of the micro-lenses.

26. A method as claimed in claim 17, wherein in said passing step, at least one of the micro-lenses corresponds to at least one light transmissive portion, a portion of one pixel electrode, and a portion of one counter electrode.

27. A method as claimed in claim 17, wherein said focusing step further includes the step of:

passing the light through an alignment layer formed on the micro-lenses.

* * * * *